United States Patent [19]

Ishihara et al.

[11] Patent Number: 5,185,219
[45] Date of Patent: Feb. 9, 1993

[54] SOLID OXIDE FUEL CELLS

[75] Inventors: Takeshi Ishihara; Hidenobu Misawa, both of Toyoake, Japan

[73] Assignee: NGK Insulators, Ltd., Japan

[21] Appl. No.: 649,988

[22] Filed: Feb. 4, 1991

[30] Foreign Application Priority Data

Feb. 15, 1990 [JP] Japan ................................ 2-32381
Mar. 27, 1990 [JP] Japan ................................ 2-75606

[51] Int. Cl.$^5$ ........................................... H01M 8/10
[52] U.S. Cl. ...................................... 429/31; 429/30; 429/32; 429/38; 429/39
[58] Field of Search ..................... 429/30, 31, 32, 38, 429/39

[56] References Cited

U.S. PATENT DOCUMENTS 4,395,468  7/1983  Isenberg ................................ 429/31
4,490,444  12/1984  Isenberg ................................ 429/32
4,686,158  8/1987  Nishi et al. ............................ 429/31

FOREIGN PATENT DOCUMENTS 0286360  10/1988  European Pat. Off. .
2148044  5/1985  United Kingdom .

Primary Examiner—William R. Dixon, Jr.
Assistant Examiner—Willie J. Thompson
Attorney, Agent, or Firm—Parkhurt, Wendel & Rossi

[57] ABSTRACT

A solid oxide fuel cell comprises a plate-like electrode body of porous ceramic having a plurality of gas flowing passages therein, a dense interconnector formed on the plate-like electrode body, a dense solid electrolyte film formed on the plate-like electrode body, an electrode film formed on the dense solid electrolyte film, a gas supply chamber, a dense partition member separating the gas supply chamber from an exhaust gas combustion chamber, and a partition member separating the exhaust gas combustion chamber from a power generation chamber. In this case, the oxidizing gas or fuel gas passing through the gas flowing passages is turned around an end portion of the fuel cell unit at the side of the power generation chamber and transferred toward the gas supply chamber and then discharged to the exhaust gas combustion chamber through a gas discharge port formed in the respective gas flowing passage.

3 Claims, 8 Drawing Sheets

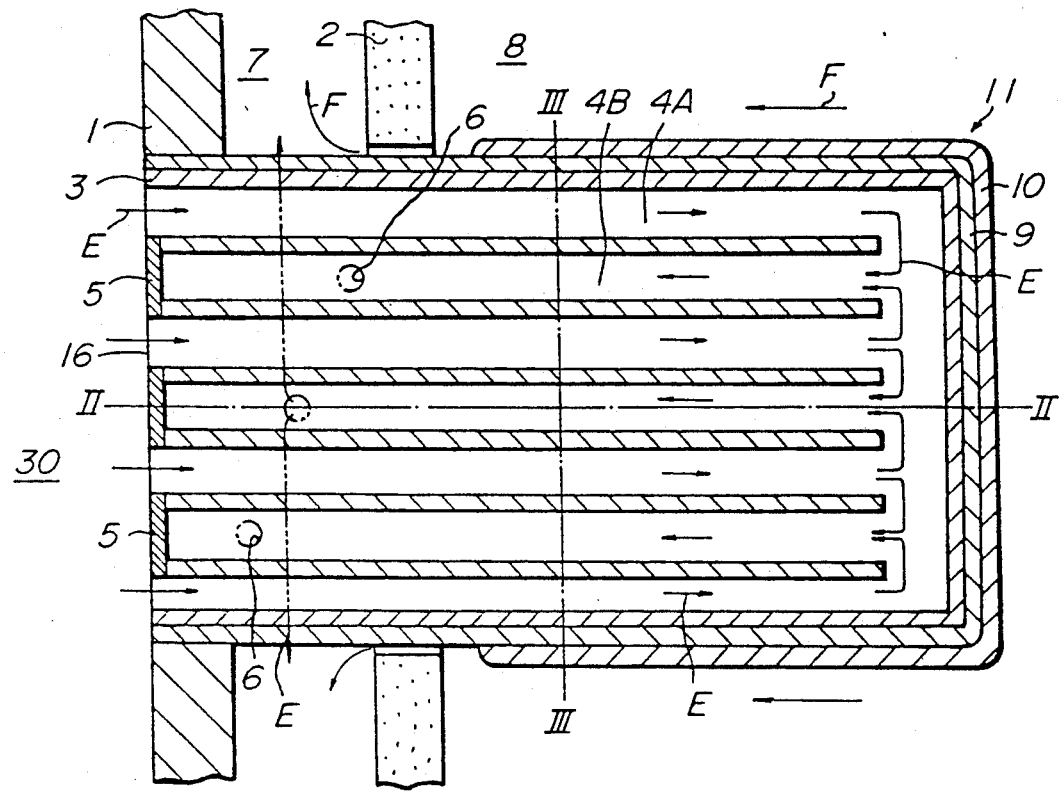
FIG_1
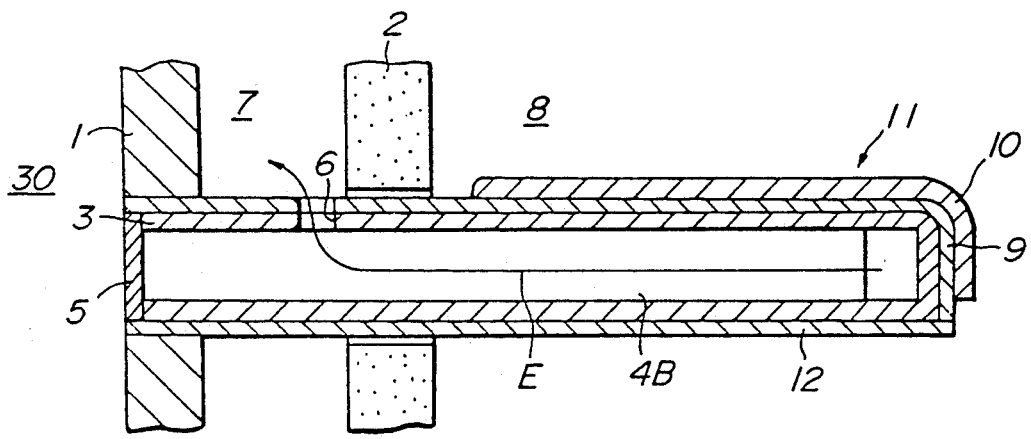
FIG_2

FIG_3
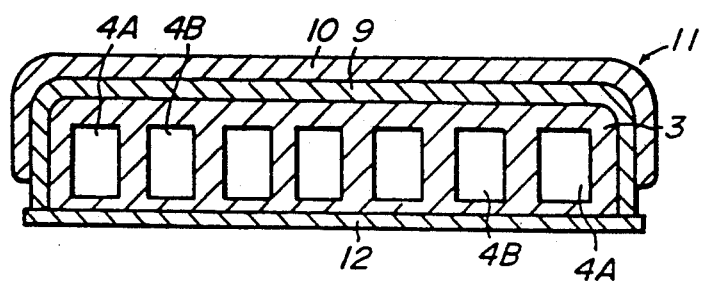
FIG_4
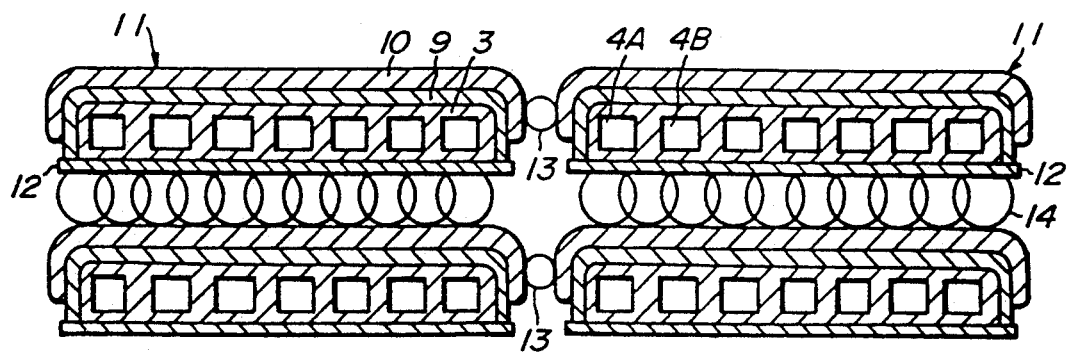

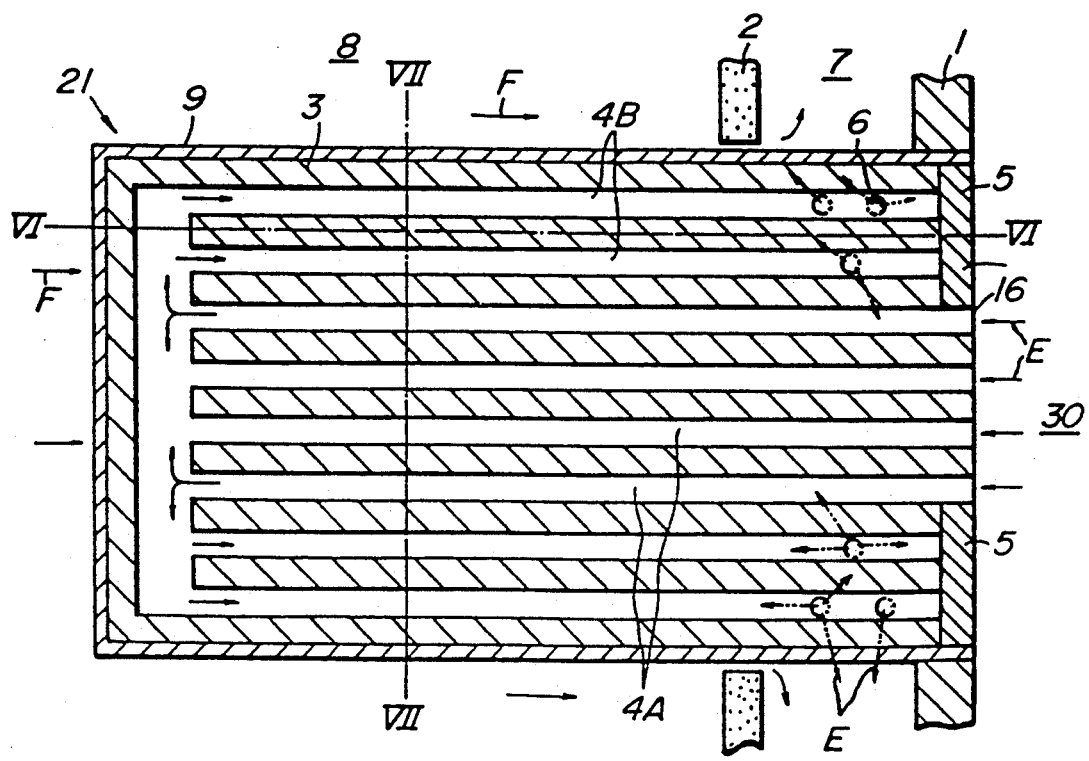
FIG_5

FIG_6
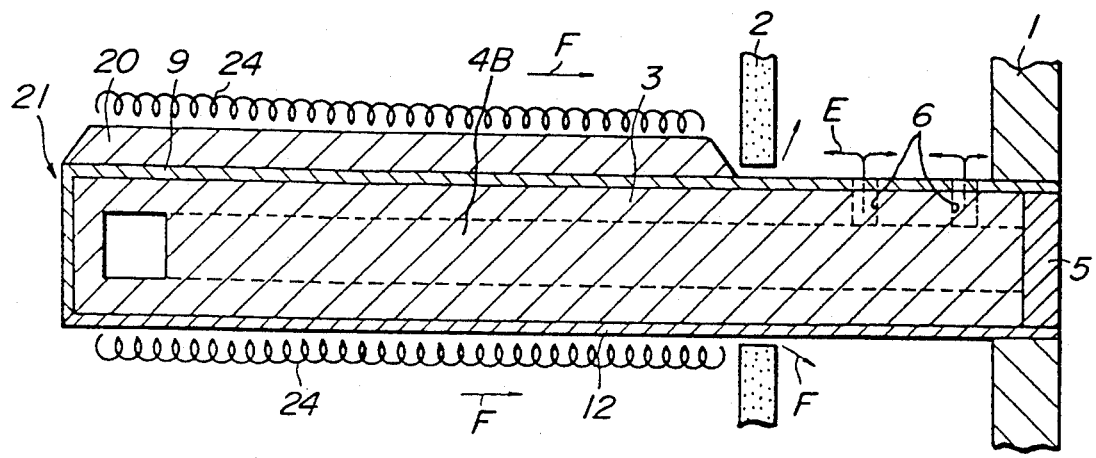
FIG_7
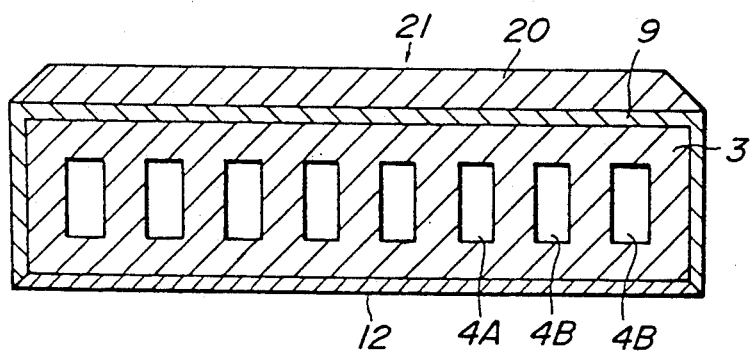

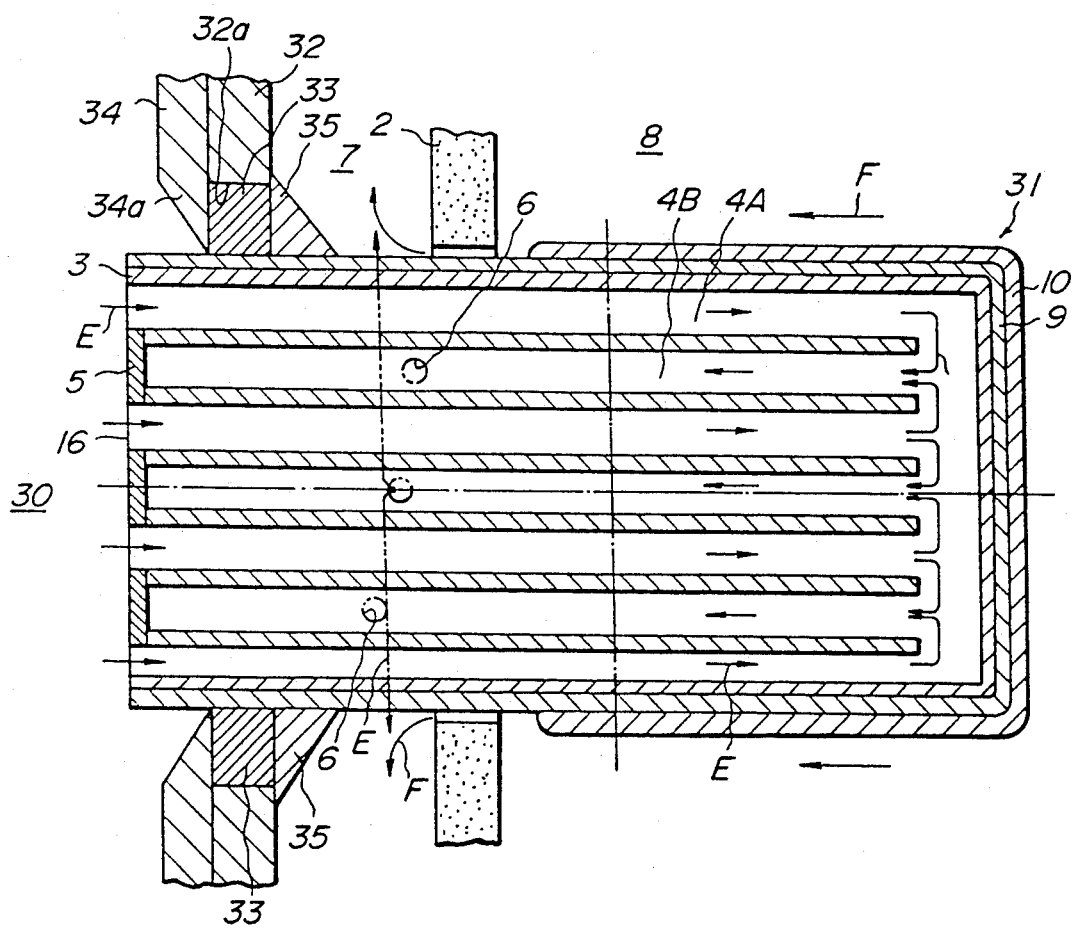
FIG_8

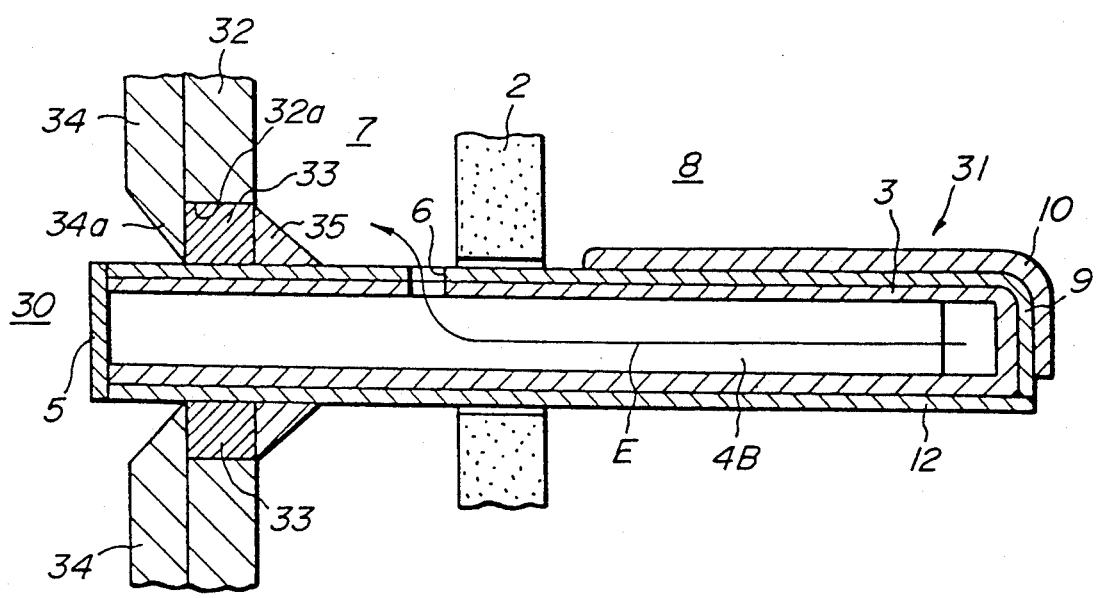
FIG_9

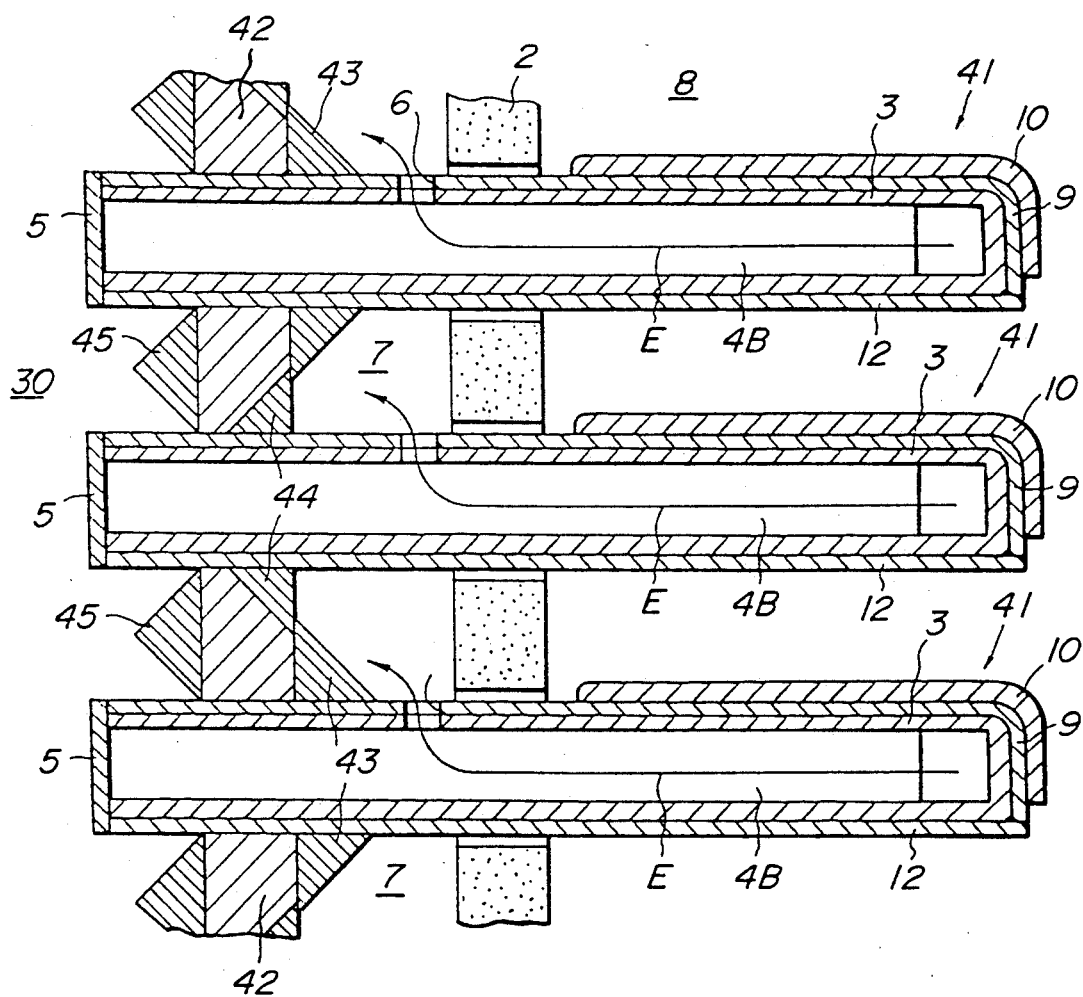
FIG_10

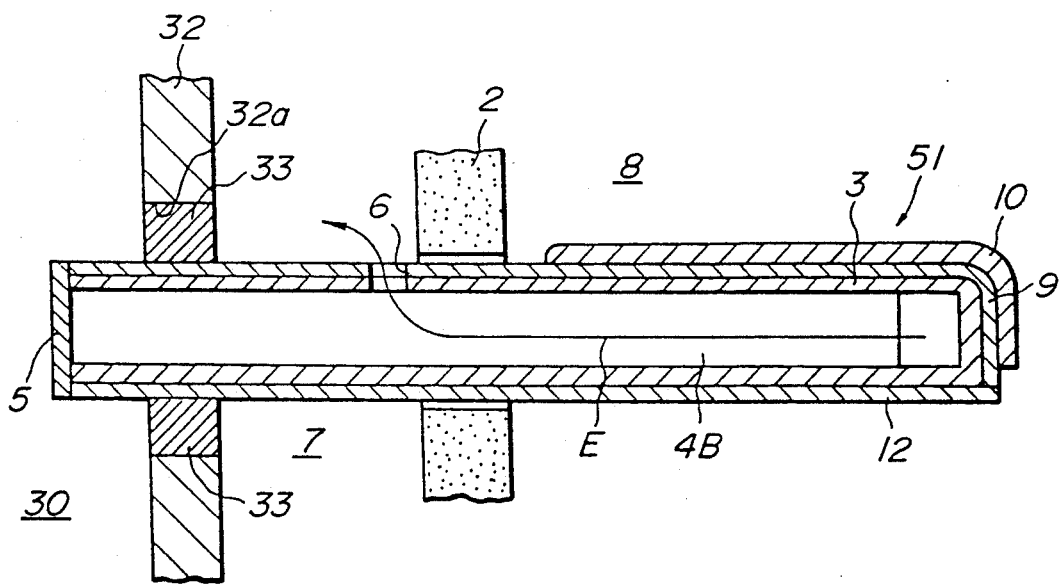
FIG_11

SOLID OXIDE FUEL CELLS

BACKGROUND OF THE INVENTION

1. Field of the Invention

This invention relates to a solid oxide fuel cell.

2. Related Art Statement

Recently, fuel cells have been recognized as power generating equipment. The fuel cell is a deuce capable of directly converting chemical energy possessed by fuel to electrical energy. Since the fuel cell is free from the limitation of Carnot's cycle, it is an extremely promising technique in that the fuel cell essentially has a high energy conversion efficiency, various fuels (naphtha, natural gas, methanol, coal reformed gas, heavy oil, etc.) may be used, the public nuisance is less, the power generating efficiency is not influenced by the scale of the equipment.

Particularly, since the solid oxide fuel cell (hereinafter abbreviated as SOFC) operates at a high temperature of 1000° C. or more, the activity of the electrode is very high, and the use of a noble metal catalyst such as expensive platinum is not required. In addition, since the SOFC has a low polarization and a relatively high output voltage, the energy conversion efficiency is considerably higher than that of other fuel cells. Furthermore, since the SOFC is constructed with solid materials, it is stable and has a long use life.

A cell unit for SOFC is generally comprised of an air electrode, a solid electrolyte and a fuel electrode.

A flat plate type SOFC cell unit is large in the effective cell area per unit volume and thus shows promise. It is known that a plurality of such flat plate type SOFC cell units are arranged in parallel with each other and rigidly and closely fixed to each other to form a power generation chamber, whereby an oxidizing gas and a fuel gas are supplied from one side of the power generation chamber and a burnt exhaust gas is discharged from the other side thereof.

However, when the cell units are rigidly and closely fixed to each other to form an airtight power generation chamber, these units are at a mutually sealed and restrained state, so that a large thermal stress occurs in an edge portion of the cell unit at a high temperature in the operation. Furthermore, electrode reaction is active in the vicinity of a supply port for the oxidizing gas and fuel gas, while electrode reaction is inactive in the vicinity of a discharge port for the exhaust gas and the temperature at this port is low, so that a large temperature gradient is caused in the power generation chamber, whereby a large thermal stress is also created. These thermal stresses are apt to produce cracks in the brittle fuel cell unit, and consequently the power generation efficiency lowers and the breakage of an assembly of these cell units proceeds.

Particularly, when the base portions of the SOFC cell units are rigidly supported by a partition wall arranged between the oxidizing gas supply chamber and the exhaust gas combustion chamber, the pushing stress becomes larger and hence cracks are also apt to be produced in the brittle cell unit.

SUMMARY OF THE INVENTION

It is, therefore, an object of the invention to provide a solid oxide fuel cell having a high reliability and an improved durability in which the occurrence of cracks is prevented by mitigating thermal stress created in the cell unit and the power generation at each position of the fuel cell unit is made uniform, by reducing the temperature gradient over a region ranging from the gas supply side of the cell unit to the end portion of the power generation chamber sides and thus the structure of the cell unit is high in strength and stable to gas.

It is another object of the invention to provide a solid oxide fuel cell having improved reliability and durability by mitigating the occurrence of stress produced through rigidly supporting the end portion of the cell unit to prevent the occurrence of cracks.

According to the invention, there is the provision of a solid oxide fuel cell comprising:

a plate-like electrode body of porous ceramic having a plurality of gas flowing passages therein;

a dense interconnector formed on at least one main surface of the plate-like electrode body;

a dense solid electrolyte film formed on at least the other main surface of the plate-like electrode body;

an electrode film formed on the dense solid electrolyte film and having a polarity opposite to a polarity of the plate-like electrode body;

a gas supply chamber for supplying an oxidizing gas or a fuel gas to the gas flowing passage;

a dense partition member holding an end portion of a fuel cell unit at a side of the gas supply chamber;

an exhaust gas combustion chamber arranged adjacent to the gas supply chamber through the dense partition member; and a partition member separating the exhaust gas combustion chamber from a power generation chamber, in which the oxidizing gas or fuel gas supplied from the gas supply chamber to the gas flowing passages is turned around an end portion of the fuel cell unit at the side of the power generation chamber and transferred toward the gas supply chamber and then discharged to the exhaust gas combustion chamber through a gas discharge port formed in the respective gas flowing passage.

In a preferable embodiment of the invention, the dense partition member supporting the outer periphery of the fuel cell unit between the gas supply chamber and the exhaust gas combustion chamber is covered a its surface with an airtight material so as not to substantially expose the surface of the dense partition member to the gas supply chamber and the exhaust gas combustion chamber.

In another preferable embodiment of the invention, the outer periphery of the fuel cell unit is supported by a porous material which provides a substantially gas impermeable barrier between the gas supply chamber and the exhaust gas combustion chamber.

BRIEF DESCRIPTION OF THE DRAWINGS

The invention will be described with reference to the accompanying drawings, wherein:

FIG. 1 is a sectional view of a first embodiment of the SOFC cell unit according to the invention;

FIG. 2 is a sectional view taken along a line II—II of FIG. 1;

FIG. 3 is a sectional view taken along a line III—III of FIG. 1;

FIG. 4 is a sectional view showing a series-parallel connecting state of the SOFC cell units shown in FIG. 1;

FIG. 5 is a sectional view of a second embodiment of the SOFC cell unit according to the invention;

FIG. 6 is a sectional view taken along a line VI—VI of FIG. 5;

FIG. 7 is a sectional view taken along a line VII—VII of FIG. 5;

FIG. 8 is a sectional view of a third embodiment of the SOFC cell unit according to the invention;

FIG. 9 is a sectional view taken along a line IX—IX of FIG. 8;

FIG. 10 is a sectional view showing a supporting state of another SOFC cell unit; and FIG. 11 is a sectional view showing a supporting state of the other SOFC cell unit.

DESCRIPTION OF THE PREFERRED EMBODIMENTS

Referring to FIGS. 1 to 3, an SOFC cell unit 11 according to the invention is constituted as follows. That is, as shown in FIGS. 2 and 3, an elongated flat plate-like air electrode body 3 is used as a support and a film of a dense interconnector 12 is formed on a lower bottom surface of the air electrode body 3 and a film of a dense solid electrolyte 9 is formed on top surface and side surfaces of the air electrode body 3. Thus, the outer surface of the air electrode body 3 is covered with the dense films. Moreover, the interconnector 12 is extended to the dense solid electrolyte film 9 over the air electrode body 3 as shown in FIG. 3, while the dense solid electrolyte film 9 is extended to one end of the air electrode body facing to a side of a gas supply chamber 30 as shown in FIGS. 1 and 2 because the air electrode body 3 is susceptible to attack by a reducing gas such as CO gas, steam or the like in an exhaust gas combustion chamber 7. Furthermore, a film of a fuel electrode 10 is formed on an upper surface and side surfaces of the solid electrolyte film 9 so as not to contact the interconnector 12 and is terminated before a porous partition member 2 separating the exhaust gas combustion chamber 7 from a power generation chamber 8 as shown in FIGS. 1 and 2.

An end of the SOFC cell unit 11 is supported by a dense partition member 1 surrounding the solid electrolyte film 9 and the interconnector 12, through which the gas supply chamber 30 for an oxygen containing gas such as air or the like is separated from the exhaust gas combustion chamber 7. On the other hand, the SOFC cell unit 11 is softly supported by the porous partition member 2 separating the exhaust gas combustion chamber 7 from the power generation chamber 8.

The flat plate-like air electrode body 3 may be made from doped or undoped $LaMnO_3$, $CaMnO_3$, $LaNiOP_3$, $LaCoO_3$, $LaCrO_3$ or the like, among which $LaMnO_3$ doped with strontium is preferable. The dense solid electrolyte film 9 ma generally be made from zirconia stabilized with yttria or the like. The fuel electrode film 10 is generally made from nickel-zirconia cermet or cobalt-zirconia cermet.

In the inside of the flat plate-like air electrode body 3 is formed a plurality of gas flowing passages 4A, 4B, in which an inlet port 16 and a closed member 5 are alternately arranged in the ends of these passages facing to the gas supply chamber 30. In the operation of the SOFC, the oxidizing gas is fed from each of the gas inlet portions 16 through each of the gas flowing passages 4A toward the end of the SOFC cell unit at the side of the power generation chamber and turned around the end in a direction opposite to the flowing direction and again passed through each of the gas flowing passages 4B toward the gas supply chamber 30 as shown by an arrow E. As shown in FIGS. 1 and 2, the closing member 5 is disposed in the end of the gas flowing passage 4B at the side of the gas supply chamber 30 and also a gas discharge port 6 facing the exhaust gas combustion chamber 7 is formed in the gas flowing passage 4B. Therefore, the oxidizing gas gives an oxygen ion to the fuel electrode film 10 through the air electrode body 3 and the solid electrolyte film 9 during the passing through the gas flowing passages 4A, 4B, which ion reacts with fuel on the fuel electrode film 10 to contribute power generation. A waste oxidizing gas having a reduced oxygen concentration is discharged from the gas discharge port 6 to the exhaust gas combustion chamber 7. On the other hand, the porous partition member 2 separating the exhaust gas combustion chamber 7 from the power generation chamber 8 is designed to produce a flowing of fuel gas toward the exhaust gas combustion chamber 7 at a slight pressure difference between the power generation chamber 8 and the exhaust gas combustion chamber 7, whereby the backward flowing of oxidizing gas from the exhaust gas combustion chamber 7 to the power generation chamber 8 is prevented. Further, fuel gas is passed in the power generation chamber 8 for use in power generation as shown by an arrow F, and a mixed gas of steam and carbon dioxide gas produced by the reaction with the oxygen ion as well as unreacted fuel gas is passed through a gap between the porous partition member 2 and the SOFC cell unit 11 toward the exhaust gas combustion chamber 7, where the mixed gas is burnt by contacting the waste oxidizing gas to preheat a fresh oxidizing gas passing through the gas flowing passages 4A, 4B.

The oxidizing gas produces oxygen ions at the interface between the air electrode body 3 and the solid electrolyte film 9, which moves through the solid electrolyte film 9 to the fuel electrode film 10. The oxygen ion reacts with the fuel gas to emit electrons to the fuel electrode film 10. Power is taken out by connecting a load between the interconnector 12 connected to the air electrode as a positive pole and the fuel electrode film 10 as a negative pole.

When these SOFC cell units 11 shown in FIG. 1 are used to form a stack as shown in FIG. 4, the interconnector 11 of the upper SOFC cell unit 11 is connected to the fuel electrode film 9 of the lower SOFC cell unit 11 through a nickel felt 14 to conduct series connection of these SOFC cell units, while the fuel electrode films 10 of the adjoining upper SOFC cell units 11 and the adjoining lower SOFC cell units 11 are connected to each other through a respective nickel felt 13 to conduct parallel connection of these units 11. Although the embodiment of FIG. 4 uses four SOFC cell units 11 for the sake of convenience the number of SOFC cell units used may freely be changed.

The solid oxide fuel cell of the above illustrated embodiment develops the following effects. (1) When supporting the brittle ceramic SOFC cell unit, only one end of the base portion of the SOFC cell unit 11 is fixed to and supported by the dense partition member 1 and also softly supported by the porous partition member 2.

Therefore, the supporting structure is entirely different from the conventional technique that the outer periphery of the SOFC cell unit is rigidly fixed, and no excessive pushing stress is caused in the SOFC cell unit 11.

(2) Since the oxidizing gas is supplied under a pressure higher than a pressure inside the exhaust gas combustion chamber 7 and continuously discharged from the gas discharge port 6 toward the exhaust gas combustion chamber, while the fuel gas is also discharged through the gap between the porous partition member 2 and the SOFC cell unit 11 toward the exhaust gas combustion chamber 7, it is not required to seal and fix the outer periphery of the SOFC cell unit 11. As a result, the occurrence of stress resulted from the sealing and fixing of the SOFC cell unit is reduced, and the reliability as a structural body is improved.

(3) Since the exhaust gas combustion chamber 7 is arranged adjacent to the gas supply chamber 30 for the oxidizing gas, for example, oxidizing gas leaked from the gas supply chamber 30 does not directly contact the fuel gas but contacts only the waste fuel passed through the power generation chamber 8 and having a small fuel content and containing a large amount of steam. As a result, not only the local rapid heat generation at the end of the SOFC cell unit but also the occurrence of cracks in the SOFC cell unit can be prevented. Furthermore, the excessive and local power generation is prevented, so that the local degradation of the SOFC cell unit can be prevented, and the durability of the SOFC cell unit is improved.

Moreover, when the end portion of the SOFC cell unit is supported by the dense partition member, ceramic fiber felt or the like having an air permeability can be used as a cushion member.

(4) In the conventional fuel cell, since the fuel content is large at one end of the cell near to the inlet port for the fuel gas, the electrochemical reaction is active and the temperature rises, and hence the reaction becomes more active with such a rising of the temperature. On the other hand, the concentration of fuel gas considerably reduces at the other end, so that the reaction is inactive and the temperature is low, and hence the reaction becomes more inactive with such a low temperature. Moreover, a large amount of $CO_2$, steam and the like is contained in the reacted fuel gas and attaches to the electrode surface to obstruct the reaction, so that the temperature decreases. This tendency is more prevalent as the size of the flat plate-like SOFC cell unit becomes larger.

On the contrary, according to the invention, the gas inlet port 16 and the closing member 5 are alternately arranged to reciprocatedly pass the oxidizing gas supplied from the gas supply port 16 in the SOFC cell unit 11 in the longitudinal direction, so that the active portion of electrode reaction is not locally concentrated but is relatively dispersed over the whole of the cell unit. As a result, the temperature gradient can be reduced over a whole of the cell and hence the reduction of thermal stress, uniformization of power generation and the improvement of the power generating effect over the entire cell units and the stack of series-parallel connection can be achieved.

(5) The adjoining gas discharge ports 6 formed in the gas flowing passages 4B are not positioned at the same plane in the lateral direction of the SOFC cell unit 11, but are alternately disposed on the plane in the lateral direction of the SOFC cell unit 11. That is, the gas discharge ports 6 being apt to decrease the structural strength are not aligned at the same plane, so that it is advantageous in view of structural dynamics, and a decrease in the strength against bending stress in the SOFC cell unit can be prevented.

(6) The fuel electrode film 10 is formed on not only the main surface but also side surfaces of the SOFC cell unit 11 without coming into contact with the interconnector 12, so that the electrode area can be enlarged.

(7) The outer peripheral surface of the air electrode body 3 is covered with the dense interconnector 12 and the dense solid electrolyte film 9 in the power generation chamber 8 and the exhaust gas combustion chamber 7, so that degradation of the air electrode body 3 due to contact with reducing gas and steam produced by combustion can effectively be prevented.

(8) Since the cell unit has a box-type multi-channel structure, the structural strength of the cell unit itself can be enhanced.

In FIG. 5 is shown another embodiment of the SOFC cell unit 21 according to the invention. FIG. 6 is a sectional view taken along a line VI—VI of FIG. 5 and FIG. 7 is a sectional view taken along a line VII—VII of FIG. 5. In FIG. 7, however, the partition members 1 and 2 and nickel felt 24 are omitted for the sake of convenience.

The whole structure of the SOFC cell unit 21 shown in FIG. 5 to 7 is substantially the same as in the SOFC cell unit 11 of FIGS. 1 to 3, so that the explanation on the same parts is omitted.

In the SOFC cell unit 21, a fuel electrode film 20 is formed on only the main surface of the cell unit (upper side surface in FIGS. 6 and 7) but does not extend to the side surface of the cell unit. In the electrical connection between the cell units, nickel felts 24 are arranged so as to contact with the lower surface of the interconnector 12 and the upper surface of the fuel electrode film 20 in the SOFC cell unit 21 as shown in FIG. 6. When such SOFC cell units 21 are arranged in the longitudinal direction to form a stack (not shown), the connection between the SOFC cell units is series. In order to uniformalize the potential distribution as a whole of SOFC comprised of plural stacks, it is desirable that the fuel electrode films 20 of the adjoining SOFC cell units 21 in the lateral direction are connected to each other with a common nickel felt 24, whereby the connection between the adjoining stacks is rendered into parallel connection. Alternatively, when a plurality of stacks each comprised of series-connected SOFC cell units 21 are connected to each other in parallel, the fuel electrode films 20 located at the upper ends of the stacks may be connected to each other with a common metal plate, while the interconnectors 12 located at the lower ends of the stacks may be connected to each other with another common metal plate.

In the above illustrated embodiment, since the fuel electrode film 20 is not formed on the side surface of the SOFC cell unit 21, only the solid electrolyte film 9 is exposed at the side surface, so that there is no risk of electrically forming a short circuit between the fuel electrode film 20 and the interconnector 12, and hence the practicality is enhanced.

In this embodiment, eight gas flowing passages 4A, 4B for the oxidizing gas are arranged in the air electrode body 3 in the longitudinal direction of the cell unit as shown in FIG. 5, among which the closing member 5 is arranged to each of the upper two passages and the lower two passages 4B, while gas supply ports 16 are arranged in the four passages 4A at the central portion of the air electrode body 3. As a result, the oxidizing gas is first supplied from the gas supply ports 16 into the gas flowing passages 4A and divided at the ends of the passages 4A in up and down directions and then entered into the gas flowing passages 4B.

The first and second embodiments may be variously modified as follows.

(a) The interconnector 12 may be extended to the side surface of the SOFC cell unit within a range of not contacting with the fuel electrode film 10 instead of the case that the fuel electrode film 10 is extended to the side surface of the SOFC cell unit as shown in FIGS. 2 and 3. In this case, the fuel electrode film 10 may be backed for avoiding the formation of a short circuit with the interconnector 12, if necessary. Furthermore, the dense interconnector 12 may be formed on the dense solid electrolyte film 9, or may be extended toward the solid electrolyte film 9 by backing the solid electrolyte film 9 so as not to overlap with the interconnector 12. In any case it is favorable that the surface of the air electrode body 3 is not exposed between the dense solid electrolyte film 9 and the dense interconnector 12.

(b) The number of the gas flowing passages, sectional shape of the passage and the like may be varied. In this case, it is preferable to alternately arrange the gas discharge port and the closing member in the gas flowing passages 4A, 4B as shown in FIG. 1 from a viewpoint of heat gradient.

In the formation of the closing member 5, there may be adopted a method wherein a mold is made from an organic material and a material for the air electrode is poured into the mold in the form of the closing member 5 and then fired to remove the organic material, a method wherein the closing member 5 is individually formed, fired and fixed to the gas supply port through adhesion, bonding, stacking, fitting or the like, and so on.

(c) In the above embodiments, the gas flowing passages are formed in the air electrode body and then the solid electrolyte film and the fuel electrode film are successively formed thereon. Inversely, the gas flowing passages for fuel gas are formed in the flat plate-like fuel electrode body and then the solid electrolyte film and the air electrode film are successively formed thereon, whereby the oxidizing gas can be passed through the power generation chamber.

(d) In supporting the SOFC cell unit with the partition member, a cushion member having an air permeability such as ceramic fiber felt or the like can be used. Furthermore, a support or flow baffle softly contacting the SOFC cell unit may be incorporated.

(e) The gas can be flown from the power generation chamber to the exhaust gas combustion chamber by using a porous body having an air permeability as the partition member 2.

(f) A porous air electrode is formed on a porous and flat plate-like conductive electrode support and further a solid electrolyte is formed thereon so as to have the same structure as in the above embodiment according to the invention.

Although the cell unit 11 is horizontally supported in FIG. 1, the whole of the SOFC itself may be vertical or may be inclined at a given angle.

The plane shape of the flat plate-like SOFC cell unit may be triangular, hexagonal, circular or the like in addition to square and rectangular. Furthermore, the plate shape of the SOFC cell unit may be wavy, conical, pyramidal, spherical or the like in addition to flat.

In FIGS. 8 and 9 is shown a third embodiment of the SOFC cell unit 31 according to the invention, in which FIG. 9 is a sectional view taken along a line IX—IX of FIG. 8. This embodiment has the same structure as in the first embodiment of FIGS. 1 to 3 except for the supporting of the SOFC cell unit at its one end.

That is, the supporting of the SOFC cell unit 31 is made as follows.

As shown in FIGS. 8 and 9, an end of the SOFC cell unit 31 is inserted into a hole 32a formed in an airtight partition member 32 and a porous member 33 is filled in a space between the the hole 32a and the outer peripheral surface of the SOFC cell unit 31, whereby the SOFC cell unit 31 is softly supported. Thus, the gas supply chamber 30 for the oxidizing gas is defined at the left side of the airtight partition member 32 and the porous member 33, while the exhaust gas combustion chamber 7 is defined at right side thereof as shown in FIGS. 8 and 9.

Further, an airtight wall member 34 is disposed onto the surface of the airtight partition member 24 facing the gas supply chamber 30 so as to cover the surface of the porous member 33, whereby the surface of the porous member 33 is not exposed to the gas supply chamber 30. Moreover, the edge portion of the airtight wall member 34 in the vicinity of the outer peripheral surface of the SOFC cell unit 31 has a slant portion 34a, and the tip of the slant portion 34a contacts the outer peripheral surface of the SOFC cell unit 31. In this case, the slant portion 34a substantially comes into contact with the SOFC cell unit 31 without fixing, so that it is permitted to locally produce a gap between the SOFC cell unit 31 and the slant portion 34a at the contacted region.

On the other hand, an airtight slant projecting portion 35 is formed on the outer peripheral surface of the SOFC cell unit 31 facing the exhaust gas combustion chamber 7 so as to cover the surface of the porous member 33 facing the exhaust gas combustion chamber 7, whereby the exposure of surface of the porous member 33 to the exhaust gas combustion chamber 7 is prevented. Moreover, the porous partition member 2 is arranged so as to separate the exhaust gas combustion chamber 7 from the power generation chamber 8, whereby the SOFC cell unit 31 is also softly supported.

As the porous member 33, use may be made of ceramic fiber felt, ceramic fiber board, refractory brick, insulated castable and the like. As a material of the airtight wall member 34, use may be made of refractory cements and mortars of alumina, mullite, zirconia and the like.

The slant projecting portion 35 may be formed by adhering, bonding or sticking the same material as in the solid electrolyte film 9 to the outer peripheral surface of the SOFC cell unit, or may be formed by subjecting the solid electrolyte film having a thicker thickness for the SOFC cell unit to a cutting work.

The airtight wall member 34 with the slant portion 34a is integrally united with the airtight partition member 32, which may be made from an insulated material such as alumina, mullite, zirconia or the like. Furthermore, the airtight partition member 34 with the slant portion 34a may be formed from a refractory cement onto the surfaces of the airtight partition member 32 and the porous member 33.

The solid oxide fuel cell comprised of the SOFC cell unit having the above structure has the same effect as in the first embodiment of FIGS. 1 to 3 and further develops the following effects.

(1) In supporting the SOFC cell unit made from brittle ceramics, only one end of the base portion of the cell unit is supported by the airtight partition member and the porous member. Importantly, the outer peripheral surface of the SOFC cell unit 31 is supported by the porous member 33.

As mentioned above, the SOFC cell unit is softly supported, which is entirely different from the conventional technique of rigidly fixing the periphery of the SOFC cell unit, so that excessive stress hardly occurs in view of the structure. Furthermore, the supporting is made by the porous member 33, so that the stress in the SOFC cell unit is more mitigated, which can effectively prevent the damaging of the SOFC cell unit.

(2) Since the surface of the porous member 33 is substantially covered with the airtight wall member 34 having the slant portion 34a and the slant projecting portion 35, the gas supply chamber 30 is sufficiently sealed to the exhaust gas combustion chamber 7. That is, even if a small amount of fresh oxidizing gas invades from a gap between the airtight wall member 34 and the SOFC cell unit 31 into the porous member 33, it is once diffused in the porous member 33 and randomly moves in the porous member 33. Moreover, after the oxidizing gas moves in the porous member 33, it should be passed through the airtight partition member 32 and the slant projecting portion 35, so that there is a very little chance of moving the oxidizing gas into the exhaust gas combustion chamber. Moreover, the movement of the oxidizing gas into the exhaust gas combustion chamber 7 can be reduced by the pressure loss inside the porous member 33.

As seen from the above, it is not required to rigidly seal the SOFC cell unit 31, so that the reliability as a structural body is more improved.

(3) Since the slant portion 34a is formed in the airtight wall member 34, even if the tip of the slant portion 34a comes into contact with the outer peripheral surface of the SOFC cell unit 31, the contact area is very small, so that the pushing stress due to the contacting can be reduced as far as possible.

In FIG. 10 is shown a stack formed by connecting a plurality of SOFC cell units 41 to each other. The SOFC cell unit 41 used in the illustrated embodiment has substantially the same structure as in the embodiment of FIGS. 8 and 9.

Moreover, this embodiment has a unique partition structure for sealing between the gas supply chamber 30 and the exhaust gas combustion chamber 7 as mentioned later.

That is, a porous member 42 is filled between the adjoining SOFC cell units 41 instead of the airtight partition member 32 shown in FIG. 9, whereby the outer peripheral surface of the SOFC cell unit 42 is covered at its one end with the porous member 42 to support the SOFC cell unit 42. Thus, when a plurality of the SOFC cell units 42 are stacked one upon the other in the longitudinal direction as shown in FIG. 10, each of the SOFC cell units is softly supported by the porous member 42.

In order to prevent leakage of the oxidizing gas from the gas supply chamber 30 to the exhaust gas combustion chamber 7, sealing is carried out by using an airtight member. That is, an airtight slant projecting member 43 or 44 is arranged on each of the SOFC cell units 42. Then, these airtight slant projecting members 43 and 44 in the adjoining upper and lower SOFC cell units are contacted with each other or separated from each other at a slight gap, whereby the surface of the porous member 42 is substantially covered so as not to exposed to the side of the exhaust gas combustion chamber 7. On the other hand, an airtight pushing member 45 having a triangular shape in section is arranged on the surface of the porous member 42 facing the gas supply chamber 30 and an edge of the airtight pushing member 45 is contacted with the outer peripheral surface of the SOFC cell unit or fixed to the porous member 42 at a slight gap to the SOFC cell unit, whereby the surface of the porous member 42 is substantially covered so as not to exposed to the gas supply chamber 30. The airtight pushing member 45 is preferably made from refractory cement, mortar or the like. Furthermore, a small protrusion (not shown) is formed on the outer peripheral surface at the end of the SOFC cell unit 42, whereby the airtight pushing member 45 may be fastened so as not to cause a position shift outward of the stack.

The SOFC of FIG. 10 has the same effect as in the SOFC of FIGS. 8 and 9. Furthermore, the SOFC cell unit 42 is supported by the porous member 42 without using the airtight partition member 32 (FIG. 9), so that the structure becomes more simple and the enhancement of spatial stacking degree for SOFC cell unit becomes easier.

Instead of the airtight pushing member 45, a slant projecting portion may be formed on the outer peripheral surface of the SOFC cell unit so as to cover the surface of the porous member 42. Alternatively, the surface of the porous member 42 may be covered by thinly applying the refractory cement, mortar or the like. Moreover, water-glass, colloidal filter or metal foil such as iron or the like may be used instead of the airtight pushing member 45.

In FIG. 11 is shown another embodiment of the SOFC cell unit 51 according to the invention, which is a modified embodiment of FIG. 9.

In the illustrated embodiment, a porous material having substantial gas impermeability is used as the porous member 32 filled in a space between the surface 32a of the airtight partition member 32 and the outer peripheral surface of the SOFC cell unit 51. In such a porous material, almost all pores are closed pores, so that substantially no open pores exist and consequently the gas permeability is substantially lost. The porous material is preferably formed by foaming glass beads or the like in the ceramic such as alumina, silica or the like.

In this embodiment, the SOFC cell unit 51 is softly supported by the porous member 33 having substantially a gas impermeability, and at the same time the sealing between the gas supply chamber 30 and the exhaust gas combustion chamber 7 can sufficiently be attained by the porous member 33. As a result, the SOFC of FIG. 11 has the same effects as in the embodiment of FIG. 9. Furthermore, the supporting structure becomes more simple, which is more favorable from a viewpoint of manufacture.

Although the invention has been described with respect to the flat plate-type SOFC cell unit, it is applicable to the supporting structure of cylindrical SOFC opened at both ends, the supporting structure of cylindrical SOFC sealed at one end and the like.

In the above embodiments, the shape, size and structure of the porous member as well as the shape and structure of the airtight member covering the surface of the porous member may variously be changed, if necessary.

As mentioned above, in the solid oxide fuel cell according to the invention, the cell unit is supported at its one end portion facing the gas supply chamber by the dense partition member, so that the excessive stress is not caused in the cell unit from a viewpoint of the structure, which is entirely different from the conventional technique of rigidly fixing the outer peripheral surface of the cell unit.

Furthermore, the exhaust gas combustion chamber is arranged adjacent to the gas supply chamber and separated from the power generation chamber through the partition member, whereby the fuel gas is fed from the power generation chamber to the exhaust gas combustion chamber, while the oxidizing gas is fed to the gas flowing passages in the plate-like electrode body and discharged from the gas outlet port to the exhaust gas combustion chamber. Therefore, the oxidizing gas and the fuel gas are not mixed before the exhaust gas combustion chamber because the oxidizing gas passage and the fuel gas passage are clearly partitioned in view of the structure of the cell unit, so that the fixing for sealing the cell unit as in the conventional technique is not necessary. As a result, there is caused no stress resulted from the fixing and sealing, and the reliability as a structural body is high. Further, the uniformization of power generation over the whole of the SOFC cell unit and the power generation efficiency can be improved.

And also, the oxidizing gas leaked from the gas supply chamber to the exhaust gas combustion chamber merely contacts with a gas having a fuel gas concentration considerably reduced in the passing through the power generation chamber, so that excessively local power generation of the SOFC cell unit can be prevented and hence the durability is improved.

Moreover, the SOFC cell unit has a box-type multichannel structure, so that the structural strength of the cell unit itself can be increased.

In the preferred solid oxide fuel cell according to the invention, the outer periphery of the cell unit is softly supported between the gas supply chamber and the exhaust gas combustion chamber by the porous member, so that the excessive stress is hardly created and can be mitigated in view of the structure, and consequently the damage of the SOFC cell unit can effectively be prevented.

Since the surface of the porous member is substantially covered with the airtight member so as not to expose to the porous member to the gas supply chamber and the exhaust gas combustion chamber or the porous member is made from a porous material having substantial gas impermeability, the leakage of a fresh gas from the gas supply chamber to the exhaust gas combustion chamber hardly occurs and the sealing is complete.

What is claimed is:

1. A solid oxide fuel cell comprising:
   at least one fuel cell unit, each fuel cell unit comprising:
   (i) a plate electrode body of porous ceramic having a plurality of gas flowing passages therein;
   (ii) a dense interconnector formed on at least one main surface of the plate electrode body;
   (iii) a dense solid electrolyte film formed on at least an other main surface of he plate electrode body; and
   (iv) an electrode film formed on the dense solid electrolyte film and having a polarity opposite to a polarity of the plate electrode body;
   a gas supply chamber for supplying an oxidizing gas or a fuel gas to the gas flowing passages;
   a dense partition member holding an end portion of each fuel cell unit at a side of the gas supply chamber;
   an exhaust gas combustion chamber arranged adjacent to the gas supply chamber through the dense partition member; and
   a partition member separating the exhaust gas combustion chamber from a power generation chamber, said exhaust gas combustion chamber communicating with said power generation chamber through a gap formed between said partition member and an outer surface of each fuel cell unit;
   wherein in said power generation chamber the oxidizing gas or fuel gas supplied from the gas supply chamber to the gas flowing passages is turned around an end portion of the fuel cell unit at the side of the power generation chamber and transferred toward the gas supply chamber and then discharged to the exhaust gas combustion chamber through a gas discharge port formed in the respective gas flowing passage.

2. The solid oxide fuel cell according to claim 1, wherein the dense partition member supporting the outer periphery of each fuel cell unit between the gas supply chamber and the exhaust gas combustion chamber is covered at its surface with an airtight material so as not to substantially expose the surface of the dense partition member to the gas supply chamber and the exhaust gas combustion chamber.

3. The solid oxide fuel cell according to claim 1, wherein an outer periphery of each fuel cell unit is supported by a porous material having a substantial gas impermeability between the gas supply chamber and the exhaust gas combustion chamber.

* * * * *